(12) United States Patent
Lim

(10) Patent No.: US 7,184,092 B2
(45) Date of Patent: Feb. 27, 2007

(54) CAMERA DRIVE UNIT AND CELLULAR PHONE EQUIPPED WITH CAMERA DRIVE UNIT

(75) Inventor: Tae Hyeong Lim, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 752 days.

(21) Appl. No.: 10/325,786

(22) Filed: Dec. 20, 2002

(65) Prior Publication Data

US 2003/0227564 A1 Dec. 11, 2003

(30) Foreign Application Priority Data

Jun. 5, 2002 (KR) ............... 10-2002-0031559

(51) Int. Cl.
*H04N 5/225* (2006.01)
*H04M 1/00* (2006.01)

(52) U.S. Cl. ............... 348/376; 455/556.1

(58) Field of Classification Search ........... 348/373, 348/374, 375, 376, 14.02
See application file for complete search history.

(56) References Cited

U.S. PATENT DOCUMENTS

| | | | | |
|---|---|---|---|---|
| 5,414,444 A * | 5/1995 | Britz | ............... | 345/156 |
| 5,491,507 A * | 2/1996 | Umezawa et al. | ....... | 348/14.02 |
| 6,069,648 A * | 5/2000 | Suso et al. | ............... | 348/14.02 |
| 6,532,035 B1 * | 3/2003 | Saari et al. | ............... | 348/14.02 |
| 6,791,597 B2 * | 9/2004 | Ando et al. | ............... | 348/14.02 |
| 6,812,954 B1 * | 11/2004 | Priestman et al. | ....... | 348/14.01 |
| 6,836,669 B2 * | 12/2004 | Miyake et al. | ........... | 455/556.1 |
| 6,876,379 B1 * | 4/2005 | Fisher | ............... | 348/14.02 |
| 6,904,298 B2 * | 6/2005 | Arai et al. | ............... | 455/556.1 |

* cited by examiner

*Primary Examiner*—Ngoc-Yen Vu
*Assistant Examiner*—Richard M. Bemben
(74) *Attorney, Agent, or Firm*—Darby & Darby

(57) ABSTRACT

The present invention relates to a camera drive unit and a cellular phone equipped with the camera drive unit to provide users with convenience in use by making an automatic control of camera's position.

1 Claim, 7 Drawing Sheets

CAMERA DRIVE UNIT AND CELLULAR PHONE EQUIPPED WITH CAMERA DRIVE UNIT

CROSS REFERENCE TO PREVIOUS APPLICATION

This application claims priority under 35 U.S.C. 119 based on the prior Korean Application No. 2002-31559, filed Jun. 5, 2002.

BACKGROUND OF THE INVENTION

1. Field of the Invention

The present invention relates to a cellular phone, mobile communication terminal, and more particularly to a camera drive unit and a cellular phone equipped with the camera drive unit to provide users with convenience in use by making an automatic control of camera's position.

2. Description of the Prior Art

In general, mobile communications consist of direct communication between mobiles(wireless transceiver), communications between a base station and multiple mobile devices (MCA wireless), and communications in which the nearby base station is selected from the plural base stations. Recently, there come SmartPhone, HPC(Hand Held PC) and PDA(Personal Digital Assistants) which users can freely perform computer works by using portable peripheral devices and transmit and receive data through network connections.

Mobile communications are in great demand for their portability and convenience, and they are being developed into small-sized and multi-functional devices to satisfy customers' various needs.

Usually, cellular phones, mobile communication devices, are classified into the bar type in which the number(function) keys are exposed to the outside with their appearances, the flip type in which a cover is placed on the number keys, and the folder type in which the phone body is folded. With trend of the phones getting small, the folder-type cellular phones are getting popular.

FIG. 1 and FIG. 2 are perspective views showing the folder type of cellular phone with a camera built-in in accordance with the prior art.

As described in the above, a folder-type phone consist of the body 100 and the folder 200. At this situation, the body 100 has the number and function keys 110 and a microphone 120 in the front, the various configuration field parts (not illustrated) for sending and receiving calls in the inside, and the battery pack (not illustrated) for power supply in the back.

In addition, the folder 200 includes LCD(Liquid Crystal Display) 210, displaying various communication and function information, and the speaker 220 and the various configuration field parts (not illustrated) as well.

The folder-type cellular phone configured as in the above has the folder 200 whose first layer is hinge-coupled to the body 100, and it opens and closes by having the folder 200 rotated forwardly or backwardly around this hinge from the body 100.

On the other hand, as it is possible to transmit high-speed data beyond simple functions of sending and receiving calls, the products are recently released with various additional functions equipped. Of the typical products is the cellular phone with a camera built-in.

Basically, the phone with a camera built-in as mentioned above can not only take and store pictures but also send them through e-mail. Or it makes it possible to make a moving picture call by speaking to with each other watching the other's face in real time. In addition, it can be used to get location information on the place the picture is taken by using a GPS function.

Thus, though not illustrated in the figures, the phones with cameras built-in are provided with in different ways. One of them is a removable type whose camera is provided separate from the phone, and the other is a built-in type whose camera is provided built-in the body of the phone.

The removable type in the above has a camera removable from the external body, and the camera direction is made to change manually. This kind of phone has a inconvenience in that a user should carry the camera with him/her separately and a shortcoming in that it makes it look hulky as the camera should be mounted on the outer body.

Particularly, to take a picture of the front face of himself/herself or the surrounding area, the camera needs rotating manually, which causes a user great inconvenience every time he/she makes its focus.

On the other hand, the built-in type has a camera built-in in the internal body. It has some advantages in that its appearance is simple and a user doesn't need to carry the camera with them separately, but to take a picture of him/her or the surrounding area, it needs rotating and making a focus manually as well.

Thus, the cellular phone equipped with a camera is increasingly in great demand for its convenience, but it is difficult for a user to take a picture of things with it freely as the user should adjust the angle of the camera manually.

To solve these problems, it was proposed a built-in type of the cellular phone equipped with a pair of cameras 500, 600 in the internal and external body as illustrated in FIG. 1 and FIG. 2. But this kind of camera causes to raise the price for a pair of cameras 500, 600. What is worse, as it consists of two cameras in the midst of smaller sizes trend, it becomes an impediment to free manufacturing and design, which consequently makes it impossible to get it smaller.

SUMMARY OF THE INVENTION

To solve the above-indicated problems, it is, therefore, an object of the present invention to provide a camera drive unit for controlling a camera location by using a driving source and improving a user's convenience and a cellular phone equipped with this camera drive unit.

To achieve the above object, there is provided a preferred embodiment of the cellular phone equipped with a camera drive unit based on the present invention as follows: a body including a circuit for calls, a microphone, buttons and a pair of fixed units, the pair of fixed units which are protruded with predetermined intervals in one end of the body and have grooves formed in the opposite direction with each other; a folder including a circuit for calls, a speaker, a display window, and a housing, in which the housing is located and hinge-coupled between the pair of fixed units in the body and the internal side of the housing is empty; a camera installed in the housing for rotating in the same direction with the folder, having a lens for imaging an object to the outside of the housing; a drive unit installed in the housing for making a driving force selectively and transferring the driving force to the camera connected to an output terminal; and a control unit for supplying electric signals to the drive unit and controlling operations.

According to another aspect of the present invention, a motor is fixed-installed in the housing for making a rotating force in the forward or backward direction by the supply of voltage; and a decelerator is installed in one end of the motor for increasing torques while reducing the rotating force.

According to another aspect of the present invention, a brush and a commutator are installed to correspond to the mutual-facing sides of the camera and the drive unit and are electrically-connected mutual-selectively in order to detect phases according to the rotation of the camera and output signals for controlling a supply voltage of the drive unit.

According to another aspect of the present invention, a switch is installed in one end of the body and is wired to control a supply voltage applied to the drive unit by an operation from a user.

According to another aspect of the present invention,: a magnetic sensor is installed to correspond to the mutual-facing sides of the camera and the drive unit in order to detect phases according to the rotation of the camera and output signals for controlling a supply voltage of the drive unit.

According to another aspect of the present invention, a housing of the folder is partly cut to the rotating direction of the camera in order to allow it to take a picture of an object by having the lens exposed to the outside when the camera is rotated.

According to another aspect of the present invention, a pair of the supporting units are protruded in a jointed shape from the body between the partly-cut parts of the housing and the side parts of the camera in order to support both side parts of the camera.

According to another aspect of the present invention, FPC is connected to the camera in its one side part thereof for inputting/outputting a supply voltage, video signals and control signals, and the FPC is extended into the folder through the cut-part of the housing.

According to another aspect of the present invention, FPC is connected to the camera in its one side part thereof for inputting/outputting a supply voltage, video signals, control signals, and the FPC is extended into the body through the cut-part of the fixed units.

According to another aspect of the present invention, one of the pair of the supporting units is connected to the side part of the camera to form a passage for connecting one end of the FPC for inputting/outputting the supply voltage, the video signals and the control signals to the body.

An alternative embodiment of the cellular phone equipped with a camera drive unit in accordance with the present invention includes a body including a circuit for calls, a microphone, buttons and a pair of fixed units, the pair of fixed units which are protruded with predetermined intervals in one end of the body and have grooves formed in the opposite direction with each other; a folder including a circuit for calls, a speaker, a display window, and a housing, in which the housing is located and hinge-coupled between the pair of fixed units in the body and the internal side of the housing is empty; a camera installed in the housing for rotating in the same direction with the folder, having a lens for imaging an object to the outside of the housing; a drive unit installed in the housing for making a driving force selectively and transferring the driving force to the camera connected to an output terminal; and a control unit for supplying electric signals to the drive unit and controlling operations.

According to another aspects in the present invention, a motor is fixed-installed in the housing for making a rotating force in the forward or backward direction by the supply of voltage; and a decelerator is installed in one end of the motor for receiving a rotating force from the motor and rotating the output terminal by increasing torques while reducing the rotating force.

According to another aspect of the present invention, the first gear is axis-jointed to the output terminal of the drive unit, having gear teeth formed on the outer surface thereof and the second gear is located in one side of the camera and connected with a post to the camera to operate in one unit with the camera, the second gear which has gear teeth formed on the outer surface thereof and is jointed to the first gear to receive the rotating force.

According to another aspect of the present invention, the first gear and the second gear include an ordinary gear and a half moon gear.

A camera drive unit in accordance with the present invention includes a camera equipped with lens for imaging an object: a drive unit for being connected with an output terminal on one end of the camera and rotating the output terminal by generating a driving force selectively: a control unit for controlling operations by approving electric signals to the drive unit.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
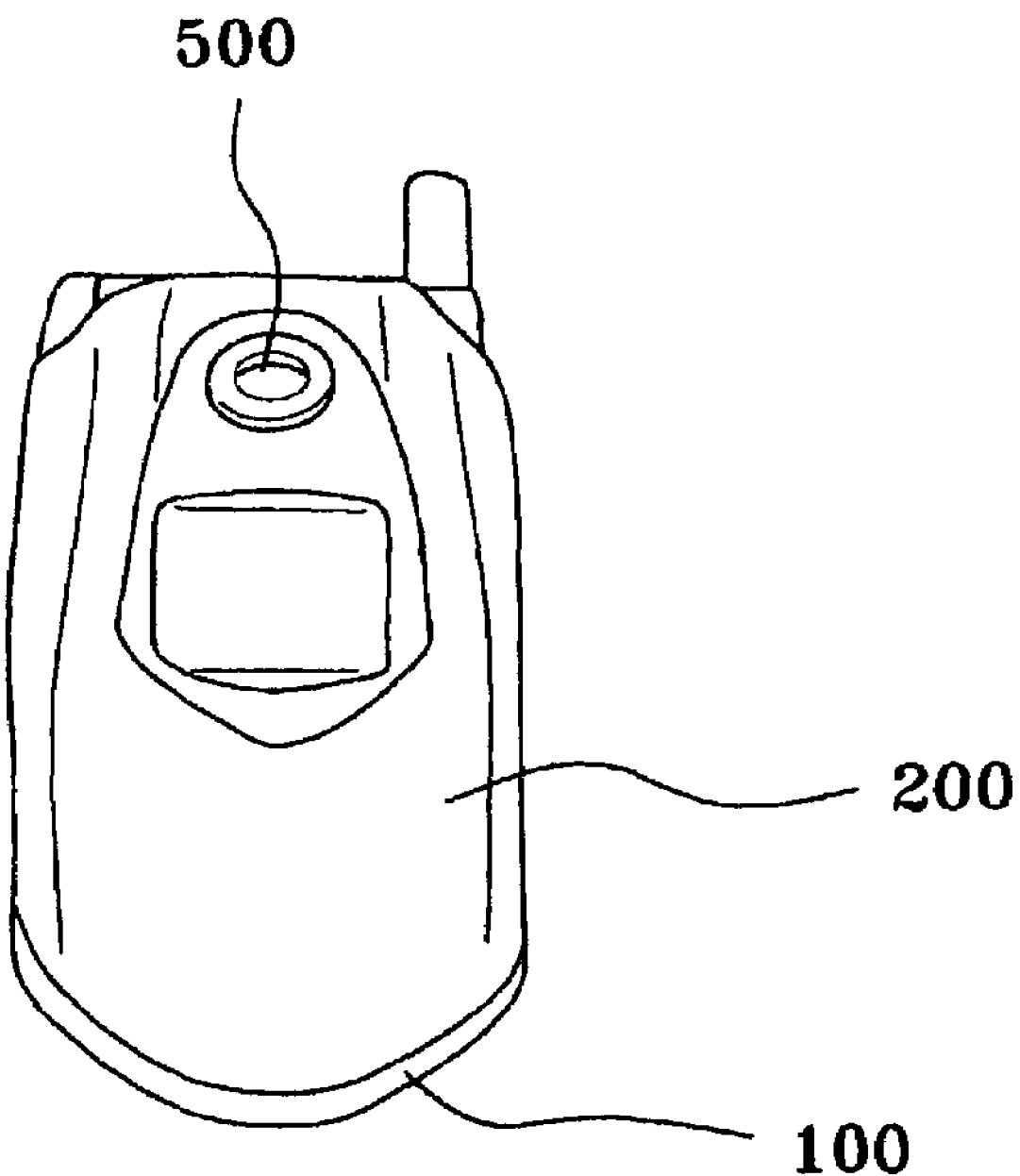
FIG. 1 and FIG. 2 are perspective views showing a folder-type cellular phone with camera built-in in accordance with the prior art.
Figure 2:
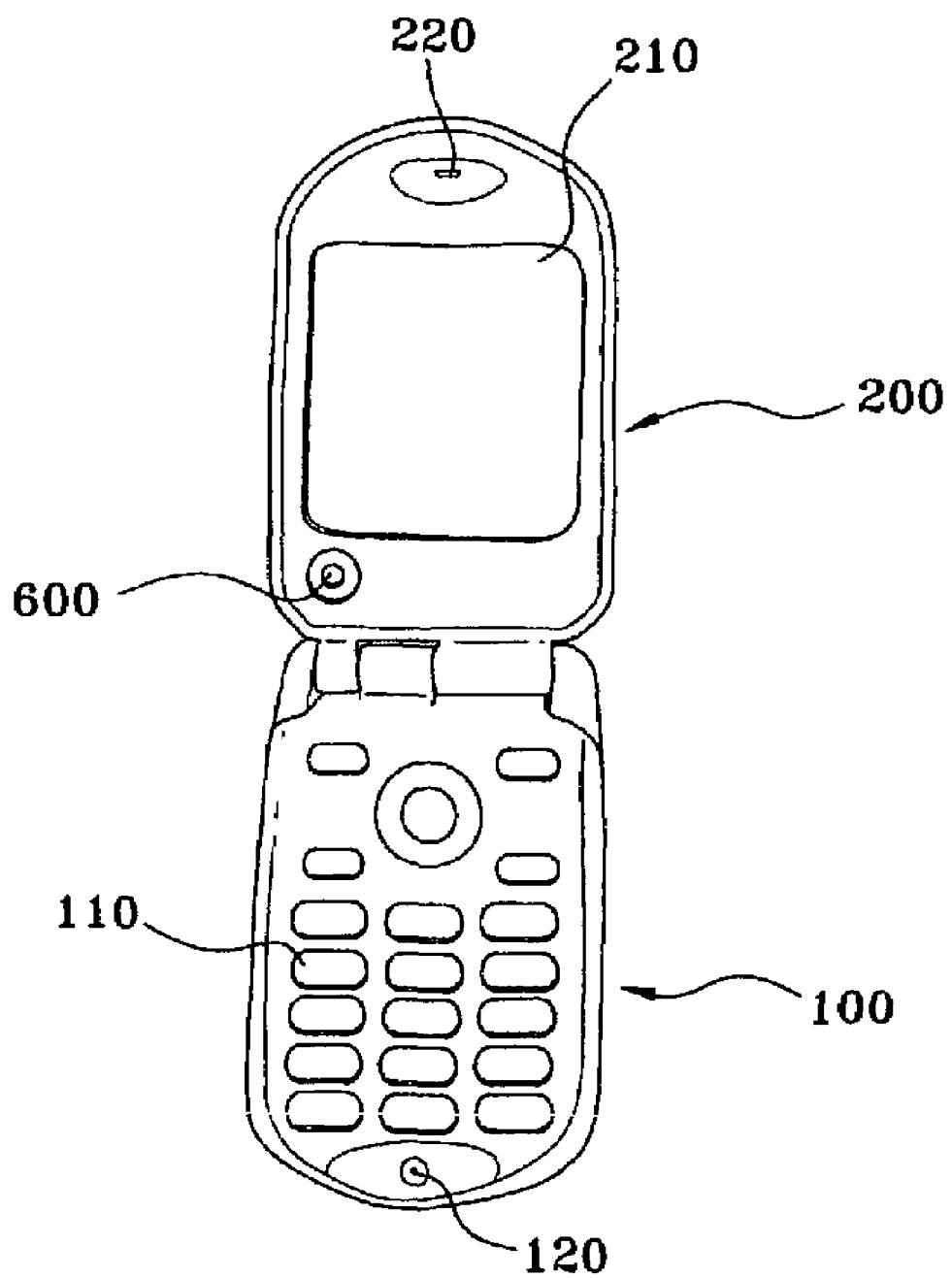
Figure 3:
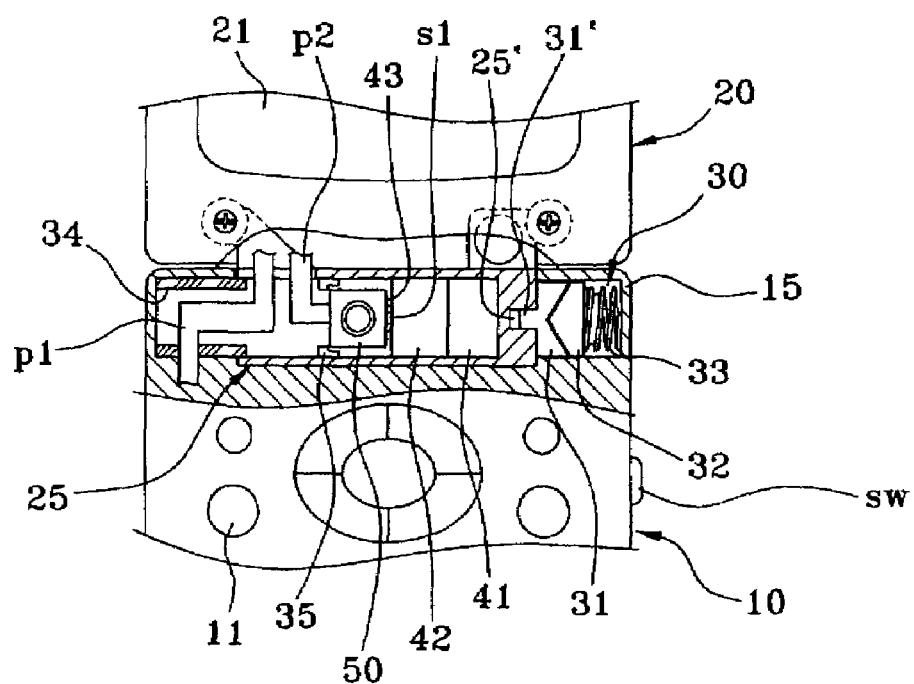
FIG. 3 is an important part of the cross section of a folder-type cellular phone showing the first preferred embodiment of a camera drive unit and a cellular phone equipped with a camera drive unit in accordance with the present invention.

A preferred embodiment of the present invention will now be described with reference to the accompanying drawings. In the following description, the preferred embodiments of a camera drive unit and a cellular phone equipped with a camera drive unit in accordance with the present invention are as follows:

FIG. 3 is an important part of the cross section of a folder-type cellular phone showing the first preferred embodiment of a cellular phone equipped with a camera drive unit in accordance with the present invention.

As described in the above, a cellular phone equipped with a camera drive unit in accordance with the present invention consists of a body 10, a folder 20, a camera 50, a drive unit and a control unit.

The body 10 is not illustrated in the drawing, but it is composed of a built-in circuit for sending and receiving calls. Buttons 11 for different functions and numbers are arranged in the front, and a microphone(not numbered) is set in one end at the bottom. The body 10 has a pair of fixed units 15 protruded at some intervals in one end. At this time, the fixed units 15 form grooves in the face-to-face direction.

In other word, seen from the drawing, the body 10 has a pair of fixed units 15 protruded at both ends of the upper side, and these fixed units 15 form grooves in the face-to-face direction for the housing 25 (described later) of the folder 20 to be hinge-coupled.

In the same manner as described in the body 10, the folder 20 has other various electrical equipments and a circuit for sending and receiving calls built-in itself, and it is equipped with a display window 21 showing call and function information in the front side or in the behind and front sides, and a speaker 22 is set in one end of the upper side. A housing 25 is set to be hinge-coupled between a pair of fixed units 15 at one end of the folder 20. The housing 25, at this time, has roughly a form of cylinder with its inside empty.

The body 10 and the folder 20 in the above are rotated by a hinge assembly 30. The hinge assembly 30, at this time, is composed of female and male couplers 31, 32, which are custom-made-coupled through mutual-tapered parts, a spring 33 and hinge dummy 34. One of the above female and male couplers 31, 32 is inserted to the housing 25 as a groove 25' and a protrusion 31' to be composed of a unit, and the other is set in the fixed unit 15 of one end to retreat from the elastic force of the spring 33. And the hinge dummy 34 is made in the form of a cylinder to be inserted into the inside of one end of the housing 25 and the fixed unit 15 of the other end which is not equipped with the female and male couplers 31, 32.

When opening and closing the folder 20 in accordance with this constitution, the female coupler 31 rotates in a unit with the folder 20 to retreat the male coupler 32 supported by the spring 33.

On the other hand, the camera 50 is arranged to rotate in the same direction with the folder 20 inside the housing 25 of the folder 20.

The camera 50 is an input unit to transmit video signals to others or to store them in the form of images, so it is installed to be able to rotate in the inside of the housing 25 in the folder 20. At this time, the camera 50 is set to rotate in the direction of the behind and front sides of the folder 20. FIG. 3 shows that the lens of the camera 50 faces the folder 20.

The camera 50 as described in the above is a means to input or output power, video signals and control signals. It is connected with FPC (p2) which is electrically connected with a circuit unit (not illustrated) in the folder 20. At this time, FPC (p2) has its one end connected to one side of the camera 50 and its other end extended to the folder 20 through the housing 25. At this time, the housing 25 is not illustrated, but it is made to have a passage in its side cut into the slit for FPC (p2) to be able to connect to the folder 20.

On the other hand, the housing 25 where the camera 50 is installed has its corresponding part cut for the lens to be able to remain exposed to the outside when the camera rotates, or its corresponding part covered with transparent materials for an object photographed to be able to be projected.

The drive unit is used for rotating the camera 50 based on an object to be photographed. Substantially, it consists of a motor 41, which generates electric power in the forward or backward direction, a decelerator 42, which decreases a rotating force from the motor 41 and at the same time increases torques.

In short, the motor 41 is installed in one end of the housing 25 to generate a rotating force by having power supplied from the outside, and the decelerator 42 is installed in one end of the motor 41 to decrease a rotating force generating in the motor 41 and increase torques to rotate an output terminal (s1). At this time, the other end of the output terminal (s1) is connected in a unit with the side of the camera 50 as illustrated in the drawing.

On the basis of the present constitution, the rotating force of the motor 41 is delivered to the camera 50 connected to the output terminal (s1) and accordingly it rotates the camera 50 in the forward or backward direction.

The control unit is used for controlling the position of the camera 50 by controlling power supplied to the drive unit with the operation signals of a user. It is largely composed of a switch sw and a phase detection unit 43.

The switch sw is substantially a means for getting the input of operation force from a user, so it is set protruded in one end of the body 10 and wired to control power supplied to the drive unit in accordance with a user's operation. It is usually desirable to have this switch sw constituted to control the forward or backward direction of the motor 41.

On the other hand, the switch sw can be set in the position of a user's easy operation, that is, in different positions of the body 10 or the folder 20, in various forms. For an example, it can be provided in the form of the keypad, that is, numbers and function buttons, furnished in front of the body 10. In addition, the switch can be made to connect in a circuit with micom built-in the cellular phone and control the drive unit through micom.

On the other hand, a phase detection unit 43 is used for rotating the position of the camera 50 as much as a predetermined angle, so it is made to operate by switch sw signals or through separate input signals, or it is made to detect the position of the camera 50 and supply a prescribed electric signal to the drive unit.

Figure 4:
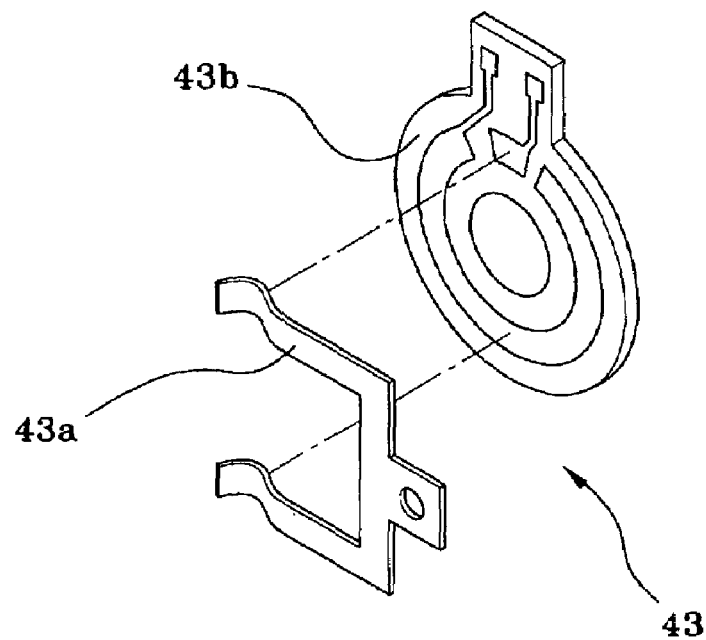
FIG. 4 is a perspective view showing a preferred embodiment of a control unit from a camera drive unit and a cellular phone equipped with a camera drive unit in accordance with the present invention.

As illustrated in FIG. 4, the phase detection unit 43 can be constituted with a brush 43a and a commutator 43b equipped in the opposite side each with the camera 50, a rotating unit, and the drive unit, a fixed unit. At this time, when contacted with the brush 43a, the commutator 43b forms a section of commutation pattern where electricity flows. In other word, as the brush 43a which rotates with the camera 50 in a unit allows electricity to flow only in the section where the commutation pattern of the commutator 43b is formed, it is possible to control the power of the drive unit by outputting a prescribed electric signals from where this commutation section starts and finishes.

On the other hand, if the phase detection unit 43 in the present invention has a constitutional feature that detects the position of the camera 50 and supplies signals to the drive unit, it can be suggested as various sensing means, not limited to such constitutions as the brush 43a and the commutator 43b. For an example, though not illustrated in the drawing, it is possible to use a hole IC, a kind of magnetic sensor, and magnet, or MR device and magnet.

When a user operates the switch sw in one end of the body 10, the cellular phone equipped with a camera drive unit in accordance with the present invention constituted as in the above, has the motor 41 driven in the forward or backward direction by operation signals of this switch sw and at the same time supplies power to the camera 50 through the decelerator 42.

At this time, the switch sw signals are constituted to control the rotating angles of the drive unit, that is, the camera 50 in various ways. For an example, a user supplies electric signals to the drive unit during the time when he/she operates the switch sw, and consequently the camera 50 can be constituted to rotate in the forward or backward direction during the switch operation.

Another preferred embodiment discloses that it is possible to rotate the camera 50 in the forward or backward direction as much as the angles are freely set by the manufacturer by means of the constitution that the phase detection unit 43 detects the phase of the camera and thereby outputs electric signals in accordance with the switch sw signals.

Another preferred embodiment discloses that if the user above operates the switch sw one time, it should be made for the drive unit, that is, the camera to rotate by means of this operation signal, but it is possible to form an instrumental stopper in the rotating course of the camera and make a compulsory stop of the camera rotation with this stopper. At this time, the camera can be made to detect over-current at the compulsory stop and control the operation of the drive unit.

Seen from the drawing, the non-described reference number 35 is a bracket where the camera 50 is prevented from flowing to the width direction of the housing 25, and (p1) is FPC to connect the body 10 and the folder 20 in a circuit, and (p2) is FPC to input or output video signals, control signals and power supplied to the camera 50.

Figure 5:
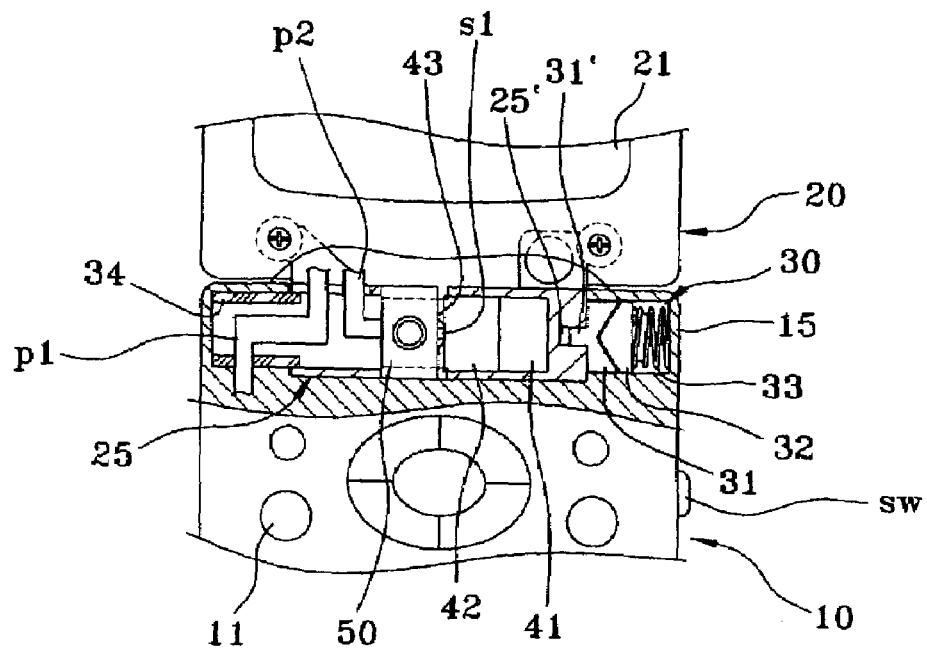
FIG. 5 to FIG. 9 are important parts of the cross sections showing different preferred embodiments in FIG. 3.

FIG. 5 to FIG. 9 are the drawings suggesting different preferred embodiments in FIG. 3. FIG. 5 discloses a constitution in which the housing 25 is partly cut as much as it corresponds to the width of the camera 50. In addition, FIG. 5 suggests that FPC (p2) for inputting or outputting video signals, control signals and power supplied to the camera 50 is connected to the folder 20 by having some of the housing 25 as a passage. At this time, the housing 25 in the same manner with FIG. 3 forms a slit type of passage for FPC (p2) to flow though.

Figure 6:
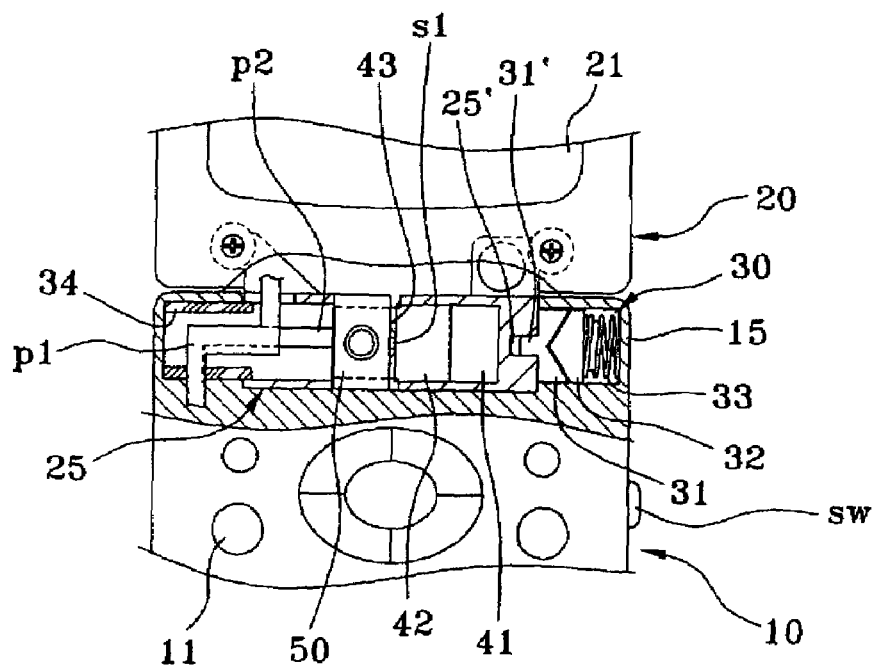

FIG. 6 suggests that FPC (p2) for inputting or outputting video signals, control signals and power supplied to the camera 50 described in the constitution of FIG. 5 is connected to the body 10 through the fixed unit 15.

Figure 7:
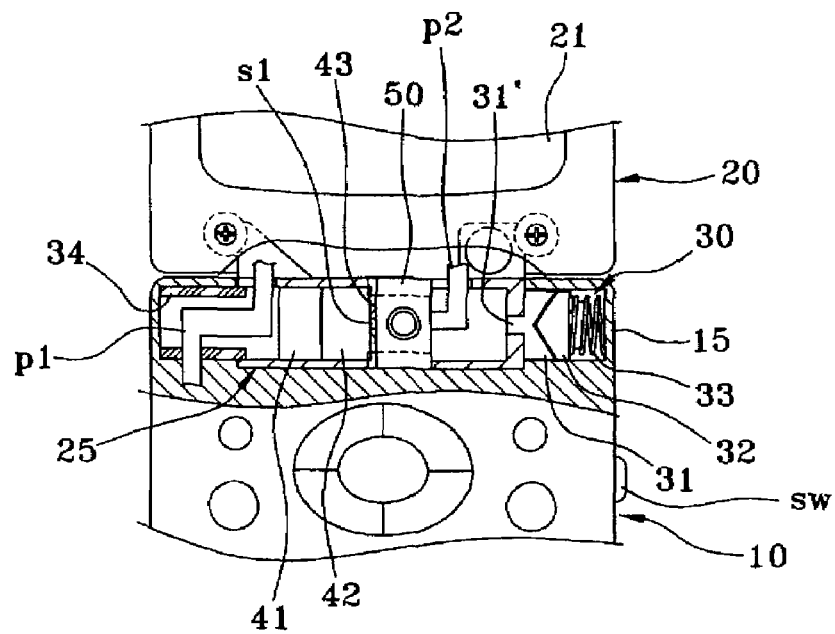

FIG. 7 suggests that the drive unit is set in the opposite position to the drive unit described in FIG. 5 to drive the camera 50, and that FPC (p2) for inputting or outputting video signals, control signals and power supplied to the camera 50 is connected to one end of the camera 50, quite opposite to that described in FIG. 5, to be extended to the folder 20.

Figure 8:
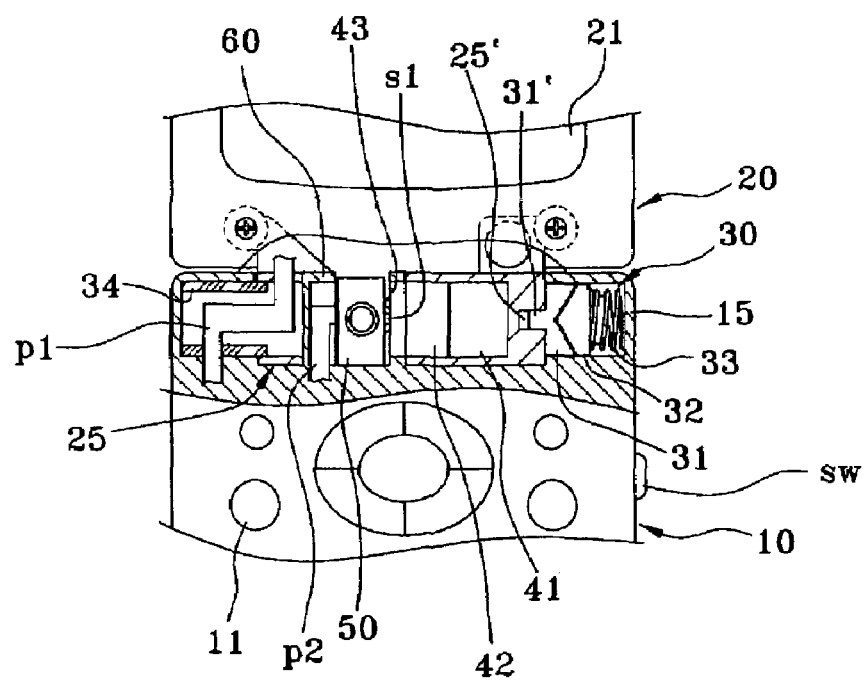

FIG. 8 suggest that the backing unit 60 is set in both sides of the camera 50 to prevent the camera 50 from being damaged by falling or external impact. At this time, the backing unit 60 shows a constitution of being protruded in a unit from one end of the body 10 with the fixed unit 15 protruded, and it is to be inserted into the space between the cut part of the housing 25 and the side of the camera 50.

The backing unit 60 thereof can protect the camera 50 from falling or other external impacts by supporting both sides of the camera 50 strongly.

On the other hand, FIG. 8 suggests that FPC (p2) for inputting or outputting video signals, control signals and power supplied to the camera 50 passes through the inside of the backing unit 60 to be connected to the folder 20.

Figure 9:
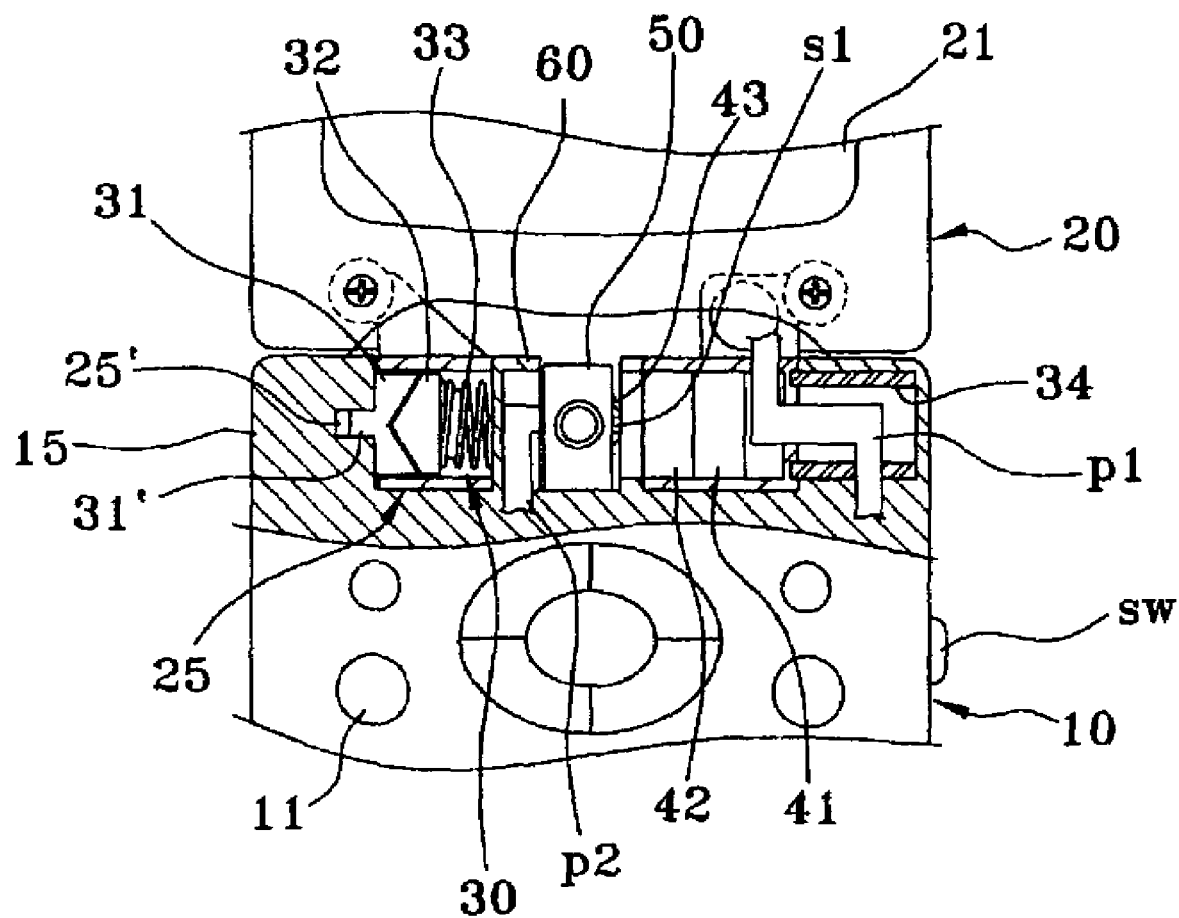

FIG. 9 suggests a preferred embodiment that the drive unit seen from FIG. 8 is constituted in the opposite position.

Figure 10:
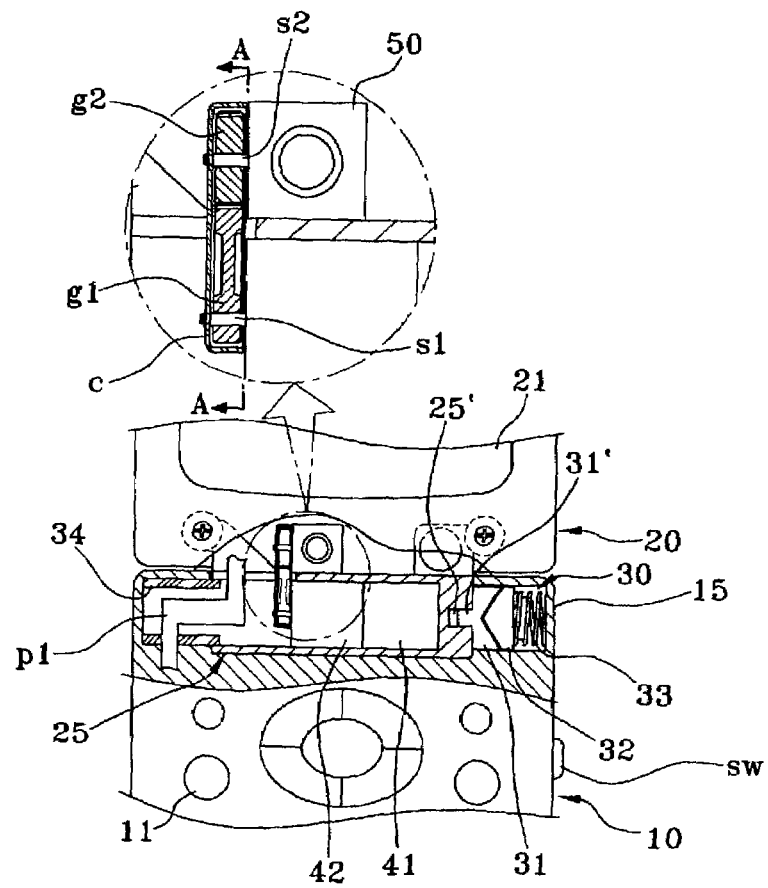
FIG. 10 is an important part of the cross section of a folder-type cellular phone showing the second preferred embodiment of a camera drive unit and a cellular phone equipped with a camera drive unit in accordance with the present invention.
Figure 11:
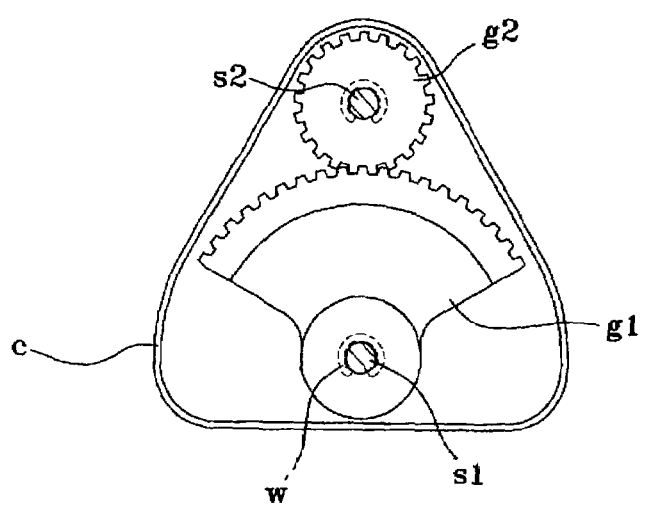
FIG. 11 is a cross section showing "A—A" line in FIG. 10.

FIG. 10 is an important part of the cross section of a folder-type cellular phone showing the second preferred embodiment of a camera drive unit in accordance with the present invention. FIG. 11 is a cross section showing "A—A" line in FIG. 10.

As described in the above, a camera drive unit and a cellular phone equipped with a camera drive unit consist of a body 10, a folder 20, a camera 50, a drive unit and a control unit. This constitution is practically the same with the structure of a cellular phone from the first preferred embodiment described in the above.

This preferred embodiment, however, suggests the camera 50 installed in the outside of the housing 25, that is, in the side of the folder 20, not in the inside of the housing 25. Accordingly, it will be described about the camera 50, the drive unit and the power transferring unit, which are the technically important part of this preferred embodiment.

The camera 50 is constituted to be installed rotatably in the through-hole in one end of the folder 20 close to the housing 25. At this time, the rotating direction of the camera 50 is made to take a picture of the behind and front directions of the folder 20.

The camera 50 as described in the above is constituted to have the driving force from the drive unit delivered through the power transferring unit, and the drive unit is made to be controlled by the control unit.

The drive unit is used for rotating the camera 50 based on an object to be photographed. Substantially, it consists of a motor 41, which generates electric power in the forward or backward direction, a decelerator 42, which decreases a rotating force from the motor 41 and at the same time increases torques. In short, the motor 41 is installed in one end of the housing 25 to generate a rotating force by having power supplied from the outside, and the decelerator 42 is installed in one end of the motor 41 to decrease a rotating force generating in the motor 41 and increase torques to rotate an output terminal (s1). At this time, the other end of the output terminal (s1) is connected in a unit with the side of the camera 50 as illustrated in the drawing.

The power transferring unit, as illustrated in the drawing, is connected to the output terminal (s1) of the drive unit to be jointed to the first gear (g1) rotating in a unit to the circumference direction, and it is connected to the camera 50 and the post (s2) to be constituted as the second gear (g2) rotating in a unit. At this time, it is desirable for the first gear (g1) and the second gear (g2) to be constituted as half-moon gear and ordinary gear.

Non-described reference number (w) is a washer to prevent the first and second gears from being separated from the output terminal (s1) and the post (s2).

On the basis of the present constitution, the forward or backward rotating force is delivered to the first gear (g1) connected to the output terminal (s1) through the decelerator 42, and the second gear (g2) jointed to this first gear (g1) is geared to rotate the camera 50 connected to the post (s2) in the forward or backward direction.

The control unit uses a switch sw for controlling the position of the camera 50 by controlling power supplied to the drive unit with the operation signals of a user. It is largely composed of a switch sw and a phase detection unit 43.

The switch sw is substantially a means for getting the input of operation force from a user, so it is set protruded in one end of the body 10 and wired to control power supplied to the drive unit in accordance with a user's operation. It is usually desirable to have this switch sw constituted to control the forward or backward direction of the motor 41.

Speaking of the cellular phone equipped with a camera drive unit in accordance with the second preferred embodiment of the present invention constituted as in the above, when a user operates the switch sw in one end of the body 10, the motor 41 runs in the forward or backward by the operational signals of this switch sw. The driving force, at this time, is delivered to the camera 50 through the decelerator 42, the first gear (g1) and the second gear (g2). Therefore, the camera 50 rotates in the forward or backward during the time the user operates the switch sw.

According to the second preferred embodiment of the present invention, the camera 50 is set in the outside of the housing 25, not in the narrow housing 25. As a result, it increases freedom in its manufacturing and design.

On the other hand, the present preferred embodiment suggests that the camera 50 rotates in the forward or backward only by the switch sw, but the present invention is not limited to it. It doesn't matter to apply the phase detection unit 43 from the first preferred embodiment to it.

When a user operates the switch sw in one end of the body 10, the camera drive unit and the cellular phone equipped with a camera drive unit in accordance with the present invention constituted as in the above, has the motor 41 driven in the forward or backward direction by operation signals of this switch sw and at the same time supplies power to the camera 50 through the decelerator 42.

At this time, the switch sw signals are constituted to control the rotating angles of the drive unit, that is, the camera 50 in various ways. For an example, a user supplies electric signals to the drive unit during the time when he/she operates the switch sw, and the camera 50 can be constituted to rotate in the forward or backward direction.

Another preferred embodiment discloses that it is possible to rotate the camera 50 in the forward or backward direction as much as the angles are freely set by the manufacturer by means of the constitution that the phase detection unit 43 detects the phase of the camera and thereby outputs electric signals in accordance with the switch sw signals.

Another preferred embodiment discloses that if the user above operates the switch sw one time, it should be made for the drive unit, that is, the camera to rotate by means of this operation signal, but it is possible to form an instrumental stopper in the rotating course of the camera and make a compulsory stop of the camera rotation with this stopper. At this time, the camera can be made to detect over-current at the compulsory stop and control the operation of the drive unit.

Speaking of the camera drive unit and the cellular phone equipped with a camera drive unit in accordance with the present invention constituted and applied as in the above, a user can easily control the positions of the camera angles through switch operations.

As a result, it can contribute to function and quality enhancements of the product due to its increased convenience in use. In addition, as a user uses a single camera, it increases freedom in its manufacturing and design, compared with a traditional cellular phone with plural cameras equipped.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A cellular phone comprising:

a body including a circuit for calls, a microphone, buttons and a pair of fixed units, the pair of fixed units which are protruded with predetermined intervals in one end of the body and have grooves formed in the opposite direction with each other;

a folder including a circuit for calls, a speaker, a display window, and a housing, wherein the housing is located and hinge-coupled between the pair of fixed units in the body and the internal side of the housing forms an enclosure;

a camera installed in the housing for rotating in the same direction with the folder, having a lens for imaging an object to the outside of the housing;

a drive unit installed in the housing for making a motor fixed-installed in the housing for making a rotating force in the forward and backward direction by the supply of voltage, and a decelerator installed in one end of the motor for increasing torques while reducing the rotating force and transferring the driving force selectively to the camera connected to an output terminal; and a control unit for supplying electric signals to the drive unit and controlling operations, including a phase detecting part consisting of a brush and a commutator installed to correspond to the mutual-facing sides of the camera and the drive unit and electrically-connected in order to detect phases according to the rotation of the camera and output signals for controlling a supply voltage of the drive unit, and a switch applied an operating voltage from a user.

* * * * *